United States Patent [19]

Goutmann

[11] 3,882,280

[45] May 6, 1975

[54] METHOD AND APPARATUS FOR COMBINING DIGITIZED INFORMATION

[75] Inventor: Michel M. Goutmann, Fort Washington, Pa.

[73] Assignee: The Magnavox Company, Fort Wayne, Ind.

[22] Filed: Dec. 19, 1973

[21] Appl. No.: 426,176

[52] U.S. Cl. ........................ 179/15 AL; 179/18 BC

[51] Int. Cl. ........................ H04j 3/08

[58] Field of Search ...... 179/15 AL, 15 BY, 15 BD, 179/15 A, 18 BC

[56] References Cited

UNITED STATES PATENTS

| | | | |
|---|---|---|---|
| 3,519,750 | 7/1970 | Beresin | 179/15 AL |
| 3,612,772 | 10/1971 | Lerouge | 179/18 BC |

*Primary Examiner*—Ralph D. Blakeslee
*Attorney, Agent, or Firm*—Thomas A. Briody; William J. Streeter; Joe E. Barbee

[57] ABSTRACT

Apparatus and method for combining digitized information, especially digitally encoded audio information, received from a plurality of input data channels for distribution in a digital communication system. Upon identification of a preselected digital sequence in one of the input channels, the apparatus couples the channel displaying the preselected condition to the communication system until identification is made of the preselected digital sequence in a different channel. At that time, the data channel, most recently displaying the preselected data sequence, is coupled to the communication system, replacing the channel previously coupled to the communication system. When the information in the input channels is comprised of digital-encoded vocal data, the preselected condition identifies the initiation of information in the channel. A plurality of channels bearing digitally encoded vocal information can be coupled to the communication system in this manner, the communication system receiving sampled data from each active channel. An audio reconstruction of the decoded information from the communication system resembles the simultaneous or conferenced reception of a plurality of channels of vocal information.

20 Claims, 7 Drawing Figures

METHOD AND APPARATUS FOR COMBINING DIGITIZED INFORMATION

BACKGROUND OF THE INVENTION

1. Field of the Invention

This invention relates generally to the distribution of digital information, and more particularly to systems in which a plurality of digitally encoded vocal information channels are combined for distribution throughout a communication system. Upon decoding of the combined channels, the vocal information contained in each of the channels is substantially reproduced.

2. Description of the Prior Art

The simultaneous transmission of a plurality of vocal input signals over a distribution system has, in the prior art, been performed in analog systems by a linear combination of the input signals. Thus all the information of each vocal input channel is retained in the distributed signals. However, when the input signals to the distribution system have been digitally encoded, the input channel signals cannot be combined in a linear manner.

A method of providing for the distribution of a plurality of channels which will function for digitally encoded input channels is the multiplexing of the input signals. Signal multiplexing involves the assignment of an input channel to a particular interval in a sequence of intervals, the sequence of intervals repeating continuously. In this technique, elaboratae timing mechanisms are required to insure that the information is distributed throughout the distribution system in the assigned interval. Furthermore, as the number of channels increases, the information contained in each channel begins to be seriously degraded. In addition and especially as the distribution system relates to vocal information, relatively few channels normally operate simultaneously. Thus, the multiplexing technique, with time intervals reserved for specified and largely unused input channels, can be highly inefficient.

In digital systems, a plurality of vocal input channels can be combined by decoding the signal received by an input channel, combining the decoded signal and the vocal information of the input channel, digitally encoding the combined signal, and distributing the digitally encoded combined signal over the distribution system. However, input channels in an intermediate position in a distribution system must add the input information, originating in the intermediate position, to information transmitted in two directions to the remainder of the system. Thus, duplication of encoding and decoding apparatus is necessary for satisfactory operation, providing for an undesirable increase in cost and complexity. Furthermore, repeated coding and decoding introduces a cumulative error in the signal.

The synchronization of a plurality of signals from input signals clocked from different time bases further complicates the combining of the digital information. Provision must be available to provide a compatible time base for the combining of digitally encoded signals.

It is therefore an object of the present invention to provide an improved communication system.

It is another object of the present invention to provide an improved method for the transfer of digital information.

It is yet another object of the present invention to provide for the transmission over a single channel of a plurality of digital input signals.

It is more particular object of the present invention to provide for combining a plurality of digitized vocal input signals for transmission over a digital communication system.

It is yet another object of the present invention to provide a digital communication system in which simultaneous conversations or conference conversations can take place.

It is still another object of the present invention to provide for synchronization of the digital information applied to a transmission line from a plurality of information channels.

It is another particular object of the present invention to provide for selection of one of a plurality of input channels for transmission over an output channel.

It is still another particular object of the present invention to provide for identification of the initiation of digitally encoded vocal information in one of a plurality of input channels and to provide for the application of the signals of the input channel with the most recent vocal information initiation to an output channel.

SUMMARY OF THE INVENTION

The aforementioned and other objects of the present invention are accomplished by providing apparatus identifying a preselected condition in a plurality of input channels containing digital information, and applying the input channel containing the most recent preselected condition to an output channel. The preselected conditions are chosen to provide a sufficient sampling of each information bearing channel that a substantial portion of the information in each input channel is transmitted by the apparatus.

The apparatus for combining the plurality of input channels can be used to provide simultaneous conversations between a plurality of stations along a communication system. A first apparatus, in a station for combining signals, combines digitally encoded signals from stations in a first direction, relative to the receiving station, with digitally encoded signals from stations in a second direction, relative to the receiving station. The combined signal is applied to a decoding apparatus and is consequently reproduced by appropriate means (e.g., loudspeaker for vocal information) at the station. A second apparatus for combining signals combines the signals from the stations in a first direction with digitally encoded signals originating at the station and transmits the combined signal to stations in the second direction. Similarly, a third apparatus for combining signals combines the signals from the stations in the second direction with digitally encoded signals originating at the station and transmits the combined signals to the stations in the first direction.

Provision is made to synchronize the signals as they are combined so that the combined digital signals are transmitted with the same signal clock.

These and other objects of the present invention will become apparent by reading the specification along with the figures.

DESCRIPTION OF THE PREFERRED EMBODIMENT

Detailed Description of the Figures

Figure 1:
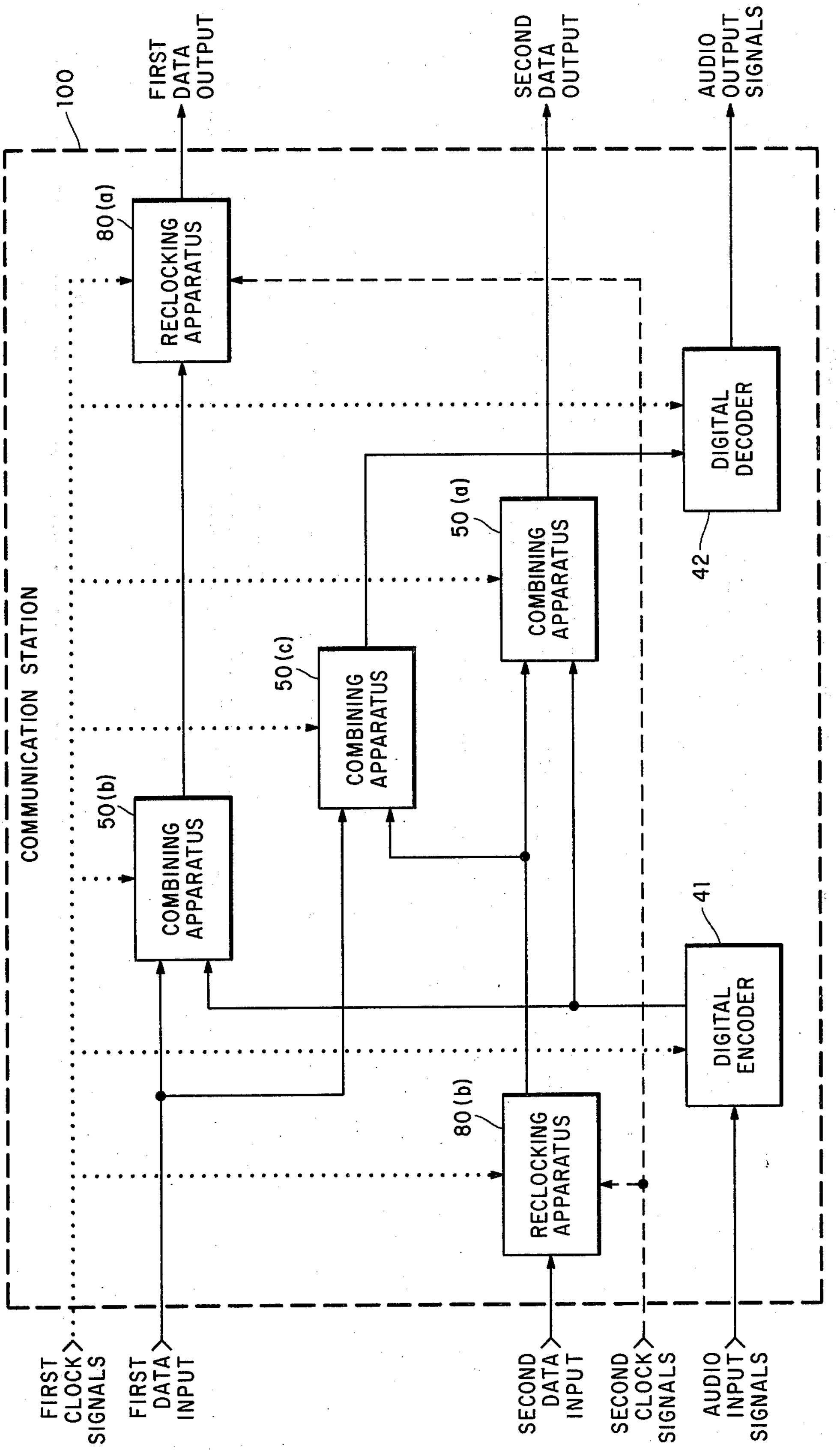
FIG. 1 is a schematic block diagram of a Communication Station according to the preferred embodiment.

Referring now to FIG. 1, a schematic block diagram of a communication station 100, according to the preferred embodiment is shown. The communication station receives First Data Input signals, which are a sequence of digital signals having a time base synchronized with First Clock Signals, and Second Data Input signals, which is a sequence of digital signals having a time base synchronized with Second Clock Signals. The Communication Station receives Audio Input Signals from a local operator and transmits Audio Output Signals to the local operator. The Communication System Second Data Output signals, are a combination of Second Input Data signals and digitized Audio Input Signals having a time base sychronized with the First Clock Signals, and the First Data Output signals, are a combination of the First Data Input signals and the digitized Audio Input Signals having a time base synchronized with the Second Clock Signal.

The Audio Input Signals are applied to digital encoder 41, which places audio information in a digital format. The First Clock Signals are applied to digital encoder 41 and determine the time base of the digital encoder output signals.

The First Data Input signals and the output signals of encoder 41, as well as the First Clock Signals, are applied to combining apparatus 50*b*). The output signals of combining apparatus 50(*b*) are applied to reclocking apparatus 80(*a*) along the First Clock Signals and the Second Clock Signals. The output signals of reclocking apparatus 80(*a*) are the First Data Output signals with the time base determined by the Second Clock Signals.

The Second Data Input Signals are applied to reclocking apparatus 80(*b*) along with the First Clock Signals and the Second Clock Signals. The output signals of reclocking apparatus, having a time base determined by the First Clock Signals are applied to combining apparatus 50(*a*) along with the output signals from the encoder 41. The output signals of combining apparatus 50(*a*) are the Second Data Output signals having a time base determined by the First Clock Signals.

The First Data Input Signals and the output signals of reclocking apparatus 80(*b*) are applied, along with the First Clock Signals to combining apparatus 50(*c*). The output signals of combining apparatus 50(*c*) and the First Clock Signals are applied to digital decoder 42. The decoder 42 converts digital information into audio information in an analog format. The output signals of decoder 42 are the Audio Output Signals.

Figure 2:
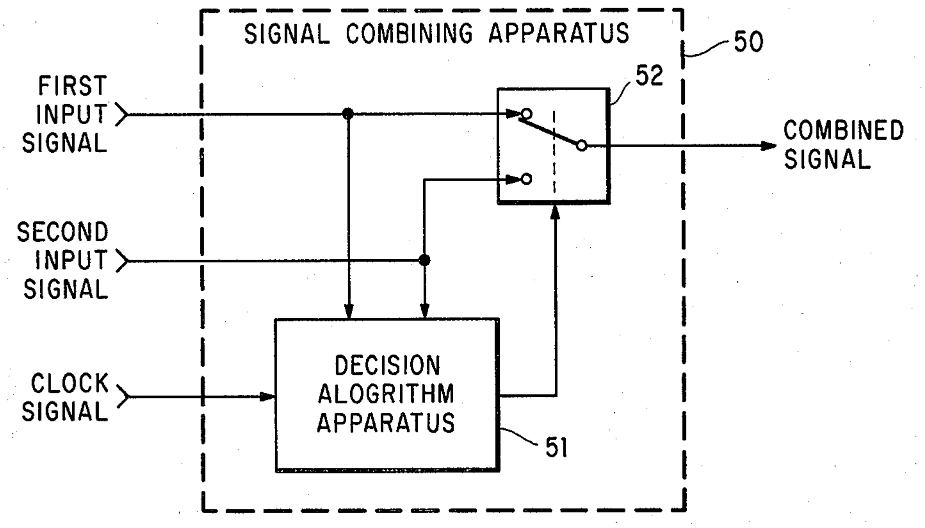
FIG. 2 is a schematic block diagram of a Combining Apparatus for combining two digital input signals into a single output signal in the preferred embodiment.

Referring next to FIG. 2, a schematic diagram of a combining apparatus 50 for combining a plurality (of which two are shown) of digital input signals to be transmitted over a communication system is shown. A First Input Signal and a Second Input Signal are applied to terminals of an electronic Switch 52. A Combined Signal is applied to the output terminal of electronic switch 52 determined by the instantaneous position of the Switch 52. The First Input Signal and the Second Input Signal as well as a Clock Signal forming the time base of the First and Second Input Signal are applied to input terminals of decision algorithm apparatus 51. An output signal from decision algorithm apparatus 51 determines the position of electronic switch 52 and the position of the Electronic Switch determines whether the First Input Signal or the Second Input Signal is applied to the output terminal of electronic switch 52.

Figure 3:
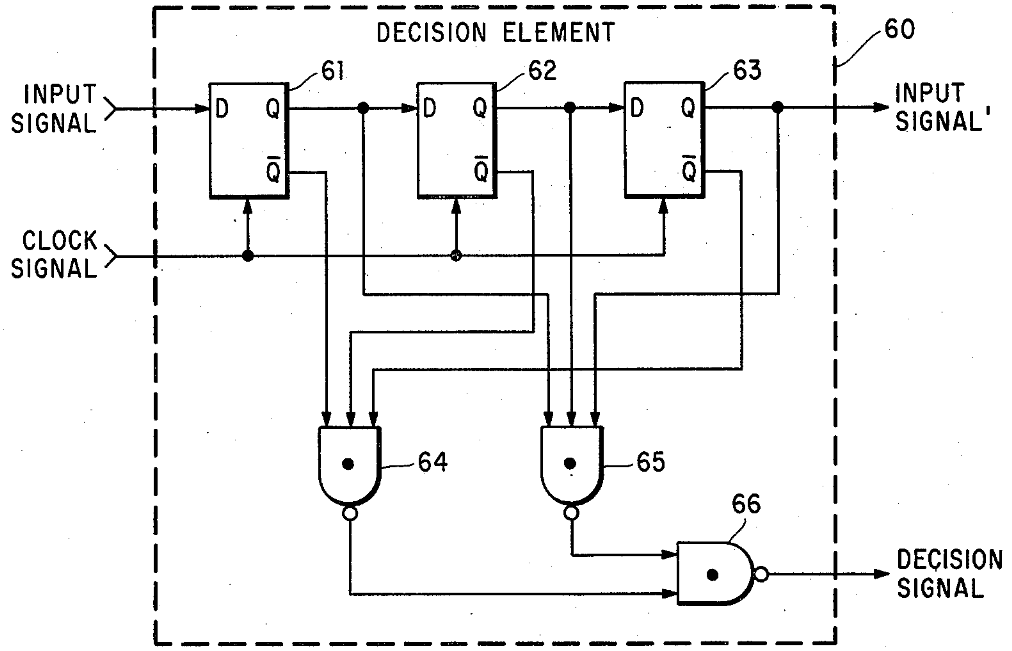
FIG. 3 is a block diagram of a Decision Element used in the Combining Apparatus in the preferred embodiment.

Referring next to FIG. 3, a decision element 60, forming a portion of the decision algorithm apparatus 51, is shown. According to the preferred embodiment, an Input Signal is applied to an input terminal of a D Flip-Flop 61 circuit element. The operation of a D Flip-Flop causes a logic signal at an input terminal of the Flip-Flop to be applied to an output terminal of the Flip-Flop with a positive-going clock signal. The detailed operation of the D Flip-Flop as well as other locig circuit elements cited below are described in Digital Electronics for Scientists by H. V. Malmstadt and C. G. Enke, published by W. A. Benjamin, Inc., New York, 1969, Chapter 5, pages 179 through 229. The output terminal of D Flip-Flop 61 is coupled to an input terminal of D Flip-Flop 62. The output terminal of D Flip-Flop 62 is coupled to an input terminal D Flip-Flop 63. Flip-Flops 61, 62, and 63 have a common Clock Signal applied to the clocking terminal. The output terminals, Q, of Flip-Flops 61, 62, and 63 are applied to input terminals of Logic Nand Gate 65, while the inverse signal output terminals, $\overline{Q}$, of Flip-Flops 61, 62, and 63 are applied to Logic Nand Gate 64. The output terminals of Logic Nand Gate 64 and 65 are applied to input terminals of Logic Nand Gate 66. The output terminal of Nand Gate 66 provides a Decision Signal, indicating coincidence of the digital signals stored in elements 61, 62, and 63 while the Input Signal transmitted by the decision element 60 is taken from the output terminal Q, of Flip-Flop 63.

Figure 4:
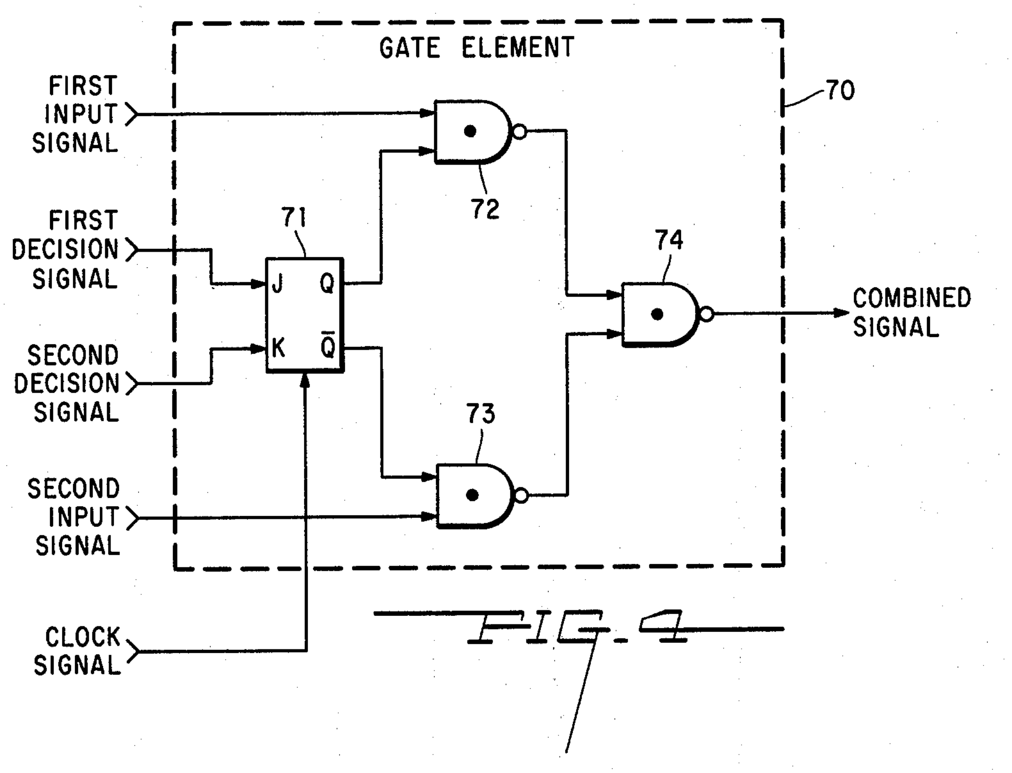
FIG. 4 is a block diagram of a Gate Element used in the Combining Apparatus in the preferred embodiment.

Referring next to FIG. 4, a schematic block diagram of a gate element 70 comprising a portion of electronic switch 52 is shown. In a "J–K" Flip-Flop 71 circuit element, a First Event Signal, from a first decision element 60 is applied to the J terminal while a Second Event Signal from a second decision element 60 is applied to the K terminal. A Clock Signal is applied to a clock terminal of the "J–K" Flip-Flop 71. The detailed operation of the "J–K" Flip-Flop is described by Malmstadt et. al. cited supra, but can be summarized as follows: upon arrival a positive-going clock signal, the logic signal at the output terminal, Q, (a) remains fixed if the J and K terminals both have negative logic signals applied to them, (b) assumes an inverse logic signal if the J and the K terminals both have positive logic signals applied to them, and (c) otherwise the output terminal assumes the logic signal of the J input terminal. The output terminal Q of "J–K" Flip-Flop 71 is coupled to a first input terminal of Logic Nand Gate 72, while a second input terminal of Logic Nand Gate 72 receives the First Input Signal. The inverse logic signal terminal $\overline{Q}$ of "J–K" Flip-Flop 71 is applied to a first input terminal of Logic Nand Gate 73 while a second input terminal of Logic Nand Gate 73 receives the Second Input Signal. The output signal of Nand Gate 72 and the output signal of Nand Gate 73 are coupled to input terminals of Logic Nand Gate 74. The output signal of Nand Gate 74 is the Combined Signal.

Figure 5:
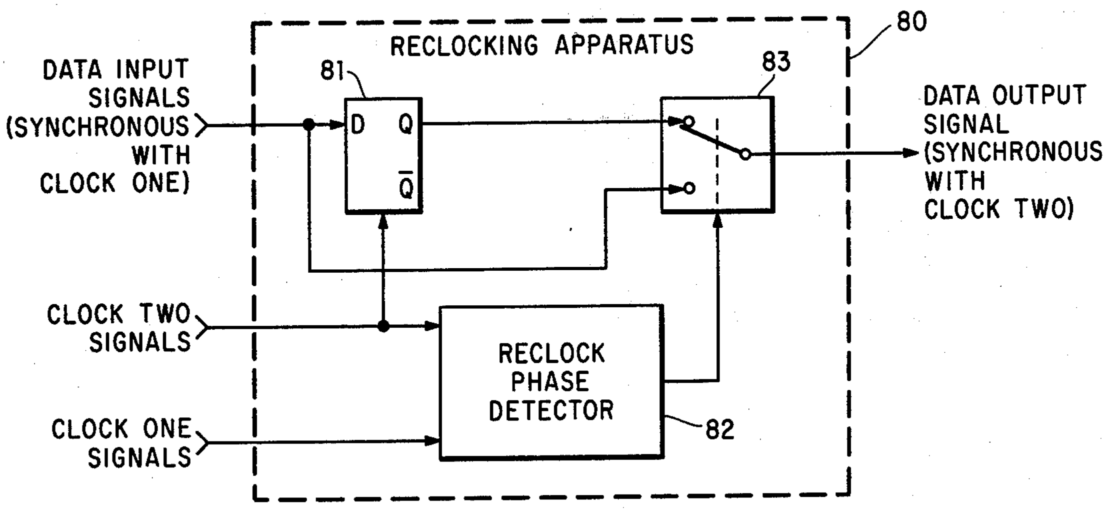
FIG. 5 is a schematic block diagram of Reclocking Apparatus used to synchronize the signal clock for combined digital signals in the preferred embodiment.

Referring next to FIG. 5, a schematic diagram of reclocking apparatus 80, used to alter the clock of a sequence digital signals, is shown. Data Input Signals, synchronous with Clock One, are applied to an input terminal of D Flip-Flop 81. Clock Two Signals, however, are applied to clock terminal of the Flip-Flop 81. The output terminal of the D Flip-Flop 81 is coupled to one input terminal of electronic switch 83 while Data Input Signals are applied to a second input terminal of electronic switch 83. Clock One Signals and Clock Two Signals are applied to reclock phase detector 82 and output signals from detector 82 determine the position of electronic switch 83. An output terminal of Switch 83 has Data Output Signals which are synchronous with Clock Two Signals. In the reclocking apparatus, the Data Input Signals are transmitted as Data Output Signals from transferring the logic signals at the input terminal of D Flip-Flop to the output terminal in the presence of Clock Two Signals. However, because of transients when Clock One Signals and Clock Two Signals are nearly in phase, reclock phase detector 82 has the Data Input Signals transferred through electronic switch 83 as Data Output Signals when the Clock One Signals and Clock Two Signals are substantially in phase.

Figure 6:
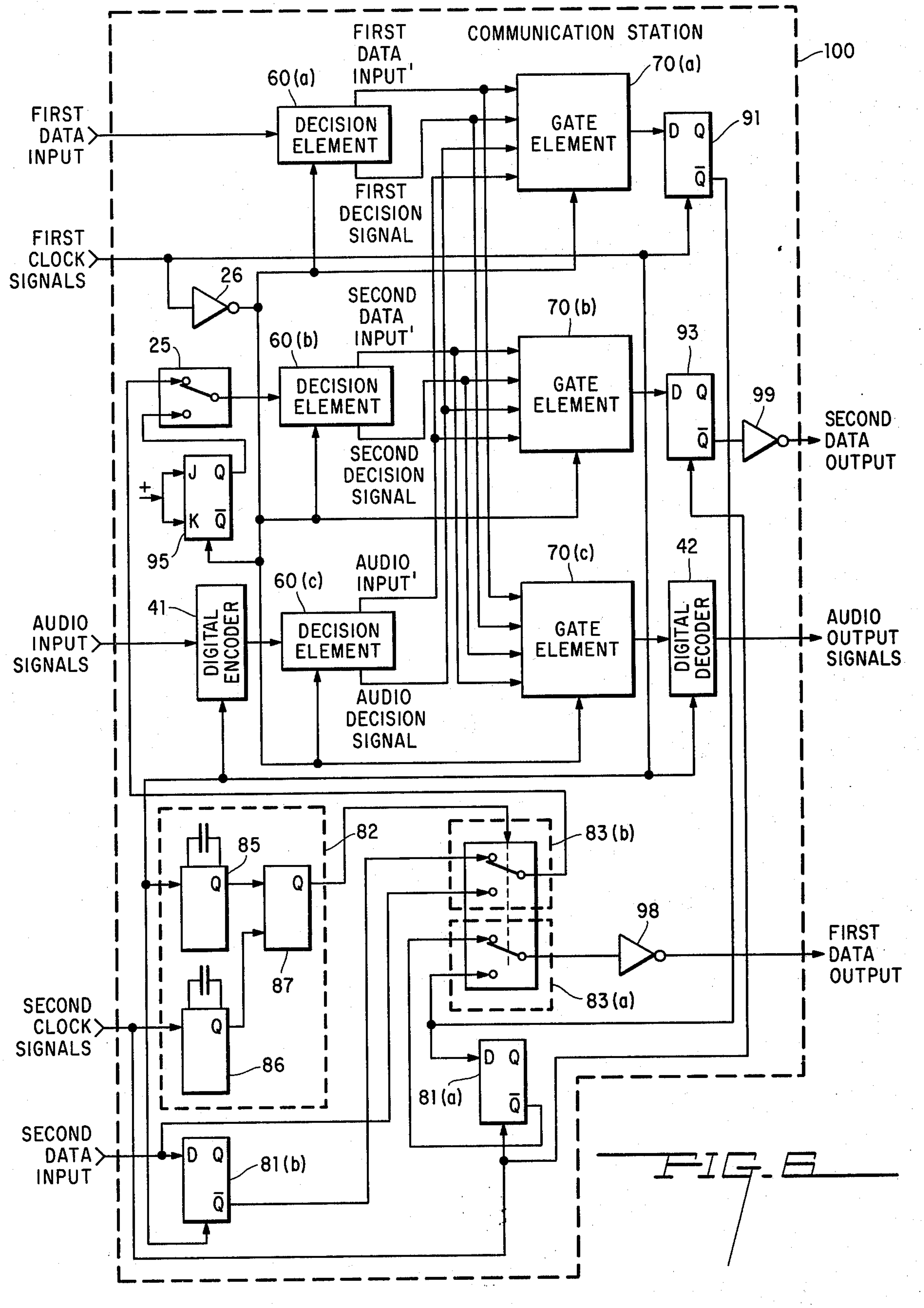
FIG. 6 is a block diagram of the circuit elements comprising the Communication Station of FIG. 1.

Referring now to FIG. 6, the implementation of communication station 100 according to the preferred embodiment is shown. First Data Input Signals are applied to decision element 60(*a*). The First Data Input Signals and the First Decision Signals produced by decision element 60(*a*) are applied to gate element 70(*a*) and gate element 70(*c*).

The Audio Input Signals are applied to digital encoder 41 along with First Clock Signals, which provide clock signals for encoder 41. The output signals of digital encoder 41 are applied to decision element 60(*c*). The Audio Input Signals and the Audio Decision Signals are applied to gate element 70(*a*) and gate element 70(*b*). The Second Data Input and the Second Data Decision Signals produced by decision element 60(*b*) are applied to gate element 70(*b*) and to gate element 70(*c*). Decision Elements 60(*a*), 60(*b*), and 60(*c*) as well as gate elements 70(*a*), 70(*b*), and 70(*c*) have First Clock Signals, inverted by inverter amplifier 26, applied to the Element clock terminals.

The signals produced by gate element 70(*a*) are applied to an input terminal of D Flip-Flop 91. The clock terminal of Flip-Flop 91 is coupled to the First Clock Signals. The inverted output terminal $\overline{Q}$ of Flip-Flop 91 is applied to reclocking apparatus 80.

The signals produced by gate element 70(*b*) are applied to an input terminal of D Flip-Flop 93. The inverted output terminal $\overline{Q}$ of Flip-Flop 93 is coupled to an input terminal of inverting amplifier 99. The clock terminal of Flip-Flop 93 is coupled to the Second Clock Signals. The output signals of amplifier 99 are the Second Data Output signals.

The signals produced by gate element 70(*c*) are applied to digital decoder 42, the decoder 42 clock terminal being coupled to the First Clock Signals. The output signals of decoder 42 are the Audio Output Signals.

The inverted output terminal $\overline{Q}$ of Flip-Flop 91 is coupled to one terminal of electronic switch 83(*a*) and to an input terminal of D Flip-Flop 81(*a*). The clock terminal of Flip-flop 81(*a*) is coupled to the Second Clock Signals. The inverse output terminal $\overline{Q}$ of Flip-Flop 81(*a*) is coupled to a second input terminal of electronic switch 83(*a*). The output terminal of electronic switch 83(*a*) is coupled to an input terminal of inverting amplifier 98. The output terminal of amplifier 98 provides the First Data Output signals.

The Second Data Input signals are applied to a first input terminal of electronic switch 83(*b*) and to an input terminal of D Flip-Flop 81(*b*). The clock terminal of Flip-Flop 81 is coupled to the First Clock Signals. The inverse output terminal $\overline{Q}$ of Flip-Flop 81(*b*) is coupled to a second input terminal of electronic switch 83(*b*). The output terminal of electronic switch 83(*b*) is coupled to one input terminal of manual switch 25. An output terminal of manual switch 25 is coupled to decision element 60(*b*). A second input terminal of manual switch 25 is coupled to an output terminal of "J–K" Flip-Flop 95. The clock terminal of Flip-Flop 95 is coupled to the inverted First Clock Signals and positive logic signals are applied to the J and the K input terminals.

The reclock phase detector 82 of the preferred embodiment is comprised of monostable multivibrators 85 and 86 and a coincidence detector 87. First Clock Signals are applied to multivibrator 85, while Second Clock Signals are applied to multivibrator 85. The appearance of a positive-going clock signal at the input of either multivibrator causes a 75 nanosecond pulse at the output terminal of the multivibrator receiving the clock signal. The output terminals of the multivibrators are coupled to input terminals of coincidence detector 87. If the two multivibrators have output signal pulses that overlap, indicating that the First Clock Signals and Second Clock Signals are substantially coincident, the output signal of detector 87 causes electronic switch 83(*b*) to assume a positive transmitting input signal directly without reclocking produced by transmission through the associated D Flip-Flops.

Figure 7:
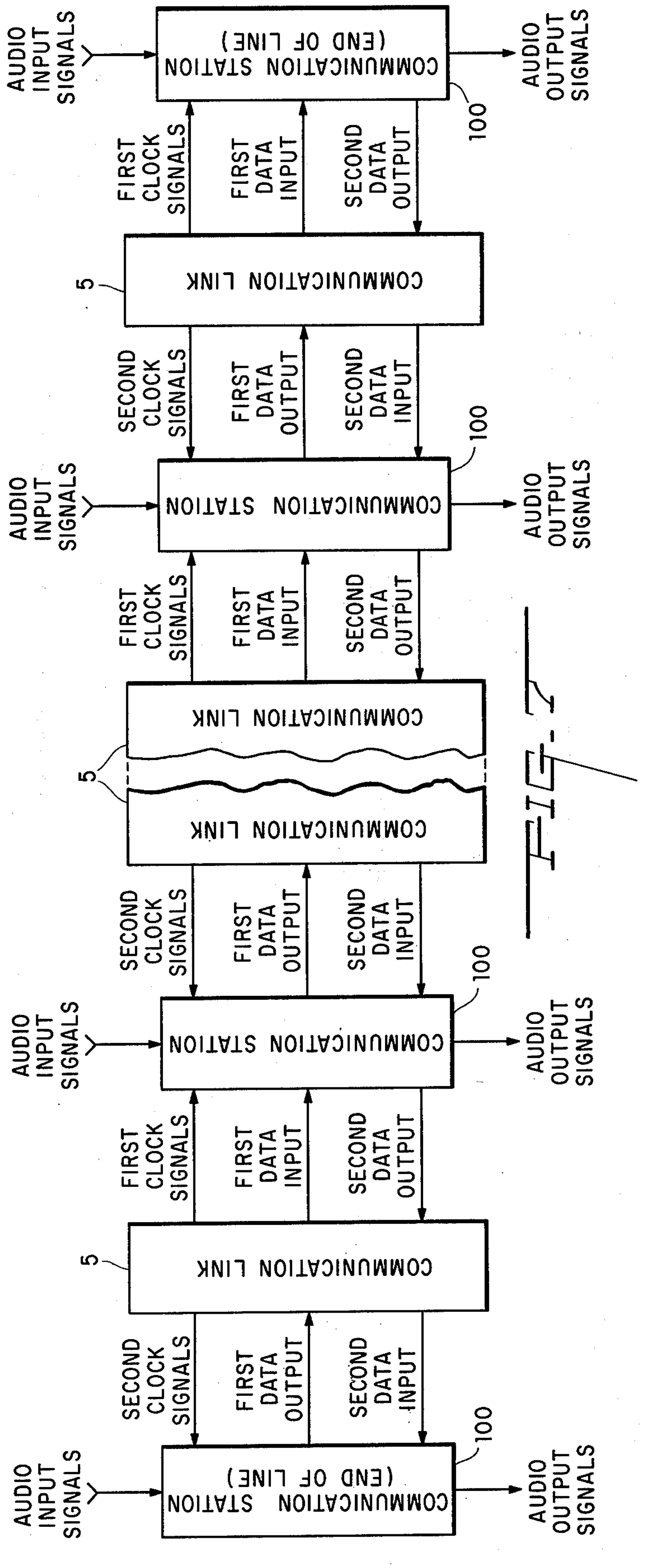
FIG. 7 is a schematic block diagram of the Communication Stations comprising a typical Communication System.

Referring next to FIG. 7 a schematic diagram of a communication system utilizing the disclosed apparatus is shown. The communications station 100 provide for local reception and transmission of information for distribution throughout the Communication System. The stations 100 are coupled by a communication links. Microwave relay stations provide one example of a communication link; however, other examples will be readily apparent to those skilled in the art.

The First Data (Input and Output) signals are transmitted in one direction along the Communication System while Second Data (Input and Output) signals are transmitted in an opposite direction. In the preferred embodiment, signals received from and transmitted to a next Communication Station are synchronized by means of the time base signals. However, other systems of synchronization are readily apparent. In the preferred embodiment the Clock Signals are reconstructed from the associated transmitted data. However, it is apparent that apparatus could be provided for direct exchanging of Clock Signals between Stations to insure synchronization. The Communication Stations located on the ends of the Communication System exchange data with only one adjoining station 100.

Application of the Preferred Embodiment

In the preferred embodiment the digital data is transmitted in a non-return-to-zero format. In this formatting of digital signals, the positive logic signals are a positive voltage signal and the negative logic signals are substantially zero voltage signals. Two consecutive positive logic signals are not separated in this type of digital transmission by a change in the positive voltage level. Therefore, it is necessary to provide a time base so that repeated logic signals can be separated.

Also in the preferred embodiment, the digital encoder and decoder utilizes the Continuously Variable Slope Delta modulation. According to this type of modulation, the digital output is adaptively varied by modulating the audio signal. In reception of a CVSD Signals, the binary input signals are reconverted to audio signals by an inverse process. In the CVSD modulation of audio input signals, an informationless transmission of data is accompanied by a sequence of logic signals alternating between positive logic signals and negative logic signals. The initiation of information transmission in this system is indicated by three successive positive logic signals or three successive negative logic signals. Therefore, in the preferred embodiment, the decision elements 60(*a*), 60(*b*), and 60(*c*) are arranged to detect the presence of these sequences of logic signals. Upon the detection of one of these sequences of digital logic signals, a decision signal (which can be construed as an interrupt request) is issued which sets a gate element in such a way that the logic signals demonstrating the onset of information are transmitted to an output terminal of the Communication Station. Thus if information is entering the system from two input channels, the gate element will be switching between the two channels. However, in the particular application in which the invention is designed to operate, i.e., the presence of vocal information, there is a large amount of information redundancy and periods of time in which the coding apparatus will not produce output signals. In addition, the properties of the ear are such that integration and reconstruction are available to "smooth" the sampled character of the received vocal information. As a consequence, the present invention permits the combining of a plurality of channels of vocal information (e.g., as is a multi-party conference environment) without appreciable loss of information content. That is to say, several conversations may be occurring simultaneously on the same communication system. Of course, as the number of channels in use increases, the amount of information lost will increase and the quality of the received information will deteriorate proportionately. As a practical matter, of course, it is very unusual for several stations to continuously talk in the presence of continued transmission from another station. Either as a matter of etiquette or as a matter of intelligibility, a plurality of operators will typically exhibit a discipline which recognizes the exchange, however rapid among single speakers. The occurrence of three identical logic signals, used in the preferred embodiment, is only one possible identifying pattern. Other patterns can be selected to switch audio channels as will be clear to one skilled in the art. In particular, when digital noise signals are present in the communication system, three identical logic signals in succession will normally not indicate initiation of information transmission and consequently will be ignored. In the presence of digital noise signals, not only the occurrence but the ratio of occurrence of specified patterns can be monitored to minimize interrupt decision signals generated by noise signals.

In the station embodying the principals of the present invention, three combining networks are present. The data from a first direction is combined with the data from a second direction to produce an Audio Out Signal for the Communication Station. The data from one direction is combined with the Audio In Signals to the Communication Station and are transmitted in the original direction in the Communication System. Similarly, data in from the second direction is combined with Audio In Signals and transmitted in the first direction in the Communication System.

It is possible to insure that all the transmissions along a transmission link are governed by the same time base by dedicating a channel to this purpose. However, in the preferred embodiment the clocks governing the data signals are typically slightly different. It is therefore necessary to provide reclocking apparatus at various points in the communication system. In the preferred embodiment, the time base change is accomplished by means of a D Flip-Flop wherein the second clock signals of the desired time base are applied to the D Flip-Flop clock terminal. In the event that the two time bases are essentially in phase, transients can be developed in the logic circuits which produce incorrect data. Therefore, in the preferred embodiment, the reclocking apparatus merely transmits the data through the electronic switch when the two time bases occur essentially simultaneously, i.e., in the preferred embodiment the time pulses occur within 75 nanoseconds of each other. Because of the redundancy in vocal information, the loss of an occasional logic bit during operation of the Reclocking Apparatus is not significant.

In the utilization of the preferred embodiment, Switch 25 of station 100 operates to determine the use of the station as a normal station transmission system or as an end-station in a Communication System. In the end station configuration, Flip-Flop 95 provides a series of signals on the First Clock time base, alternating positive and negative logic signals, and provides an informationless channel in the CVSD modulation technique.

The above description is included to illustrate the operation of the preferred embodiment and is not meant to limit the scope of the invention. The scope of the invention is to be limited only by the following claims. From the above discussion, many variations would be apparent to one skilled in the art that would yet be encompassed by the spirit and scope of the invention.

What is claimed is:

1. A plurality of communication stations for permitting simultaneous exchange of vocal information between said communication stations wherein each of said stations comprises:

first means for combining first digitally-encoded signals from a first group of said communication stations with second digitally encoded signals from a second group of said communication stations, output signals from said first combining means providing data to said station from said first and second group of communication stations;

second means for combining said first signals with digitally encoded local signals, output signals from said second combining means for distribution to said second group of said communication stations; and third means for combining said second signals with said local signals, output signals from said third combining means for distribution to said first group of said communication stations.

2. The communication station of claim 1 further including means for synchronizing said first and said second digitally encoded signals.

3. The communication station of claim 1 further including means for encoding said local signals; and means for decoding output signals from said second combining means.

4. The communication station of claim 1 wherein each of said combining means includes a switch, wherein a first state of said switch causes a first input signal to be applied to an output terminal of said switch and wherein a second state of said switch causes a second input signal to be applied to said output terminal of said switch;

first means for identifying a preselected condition in said first input signal, wherein identification of said preselected condition by said first identification means causes said switch to be in said first state; and second means for identifying a preselected condition in said second input signal, wherein identification of said preselected condition by said second identification means causes said switch to be in said second position.

5. The communication station of claim 4 wherein each of said identification means includes a plurality of elements for storing digital data; and means for identifying simultaneous storage of preselected logic signals in said plurality of storage elements.

6. The communication station of claim 5 wherein said switch includes:

logic means for applying a first logic signal to a first output terminal when a signal is applied to a first input terminal of said logic means, said logic means applying a second logic signal to a second output terminal when a signal is applied to a second input terminal;

a first logic gate having a first input terminal coupled to said first output terminal of said logic means and a second input terminal coupled to said first input signals; and a second logic gate having a first input terminal coupled to said second output terminal of said logic means and a second input terminal coupled to second input signals.

7. The communication station of claim 2 wherein said signal synchronizing means includes:

a logic element, wherein a first digital signal is applied to an input terminal of said logic element, said first digital signal synchronized with first clock signals, a clock terminal of said logic element coupled to second clock signals;

a switch, a first position of said switch coupling said first digital signal to an output terminal of said switch, a second position of said switch coupling an output terminal of said logic element to said switch output terminal; and means for detecting an occurrence of said first clock signals and said second clock signals within a preestablished period causing said switch to be in said second position.

8. Apparatus for receiving data from and for entering data into a communication system comprising:

first means for synchronizing second digitally encoded data signals with first clock signals;

first means for combining output signals from said first synchronizing means with first digitally encoded data signals;

means for decoding output signals from said first signal combining means;

second means for combining said first synchronizing means output signals with output signal from said encoding means;

third means for combining said encoding means output signals and said first digitally encoded data signals; and second means for synchronizing a selected one of output signals from said second combining means output signals with said second clock signals.

9. A method of providing simultaneous exchange of digitally encoded vocal information between a plurality of communications stations comprising the steps of:

arranging said communications stations in an ordered sequential order; transmitting digitally encoded vocal information in a first direction in said ordered sequence;

transmitting digitally encoded vocal information in a second direction in said ordered sequence;

combining information entered at a one of said communication stations with information transmitted in said first direction and with information transmitted in said second direction in said ordered sequence; and extracting information at each of said communication stations, said extracted information being a combination of information transmitted in a first direction and information transmitted in a second direction.

10. The method of exchanging data of claim 9 wherein combining information includes the steps of:

identifying a preselected condition in a first and in a second digitally encoded signal channel; and transmitting information in a signal channel in which said preselected condition has been identified.

11. A method of combining digitally encoded vocal data comprising the steps of:

a. identifying an information condition in a first channel containing digitally encoded vocal data;

b. transmitting in an output signal channel said first channel data after identification of said information condition in said first channel;

c. identifying said information condition in a second channel containing digitally encoded vocal data;

d. transmitting in an output signal channel said second channel data after identification of said information condition in said second channel; and e. repeating steps a through d.

12. The method of combining digitally encoded vocal data of claim 11 wherein step a includes identifying an initiation of vocal information in said first channel and wherein step c includes identifying an initiation of vocal information in said second channel.

13. A communication station for extracting data signals from and for entering data signals into a communication system comprising:

a first decision element for producing a first decision signal upon identification of a preselected condition in first digitally encoded data signals;

a second decision element for producing a second decision signal upon identification of said preselected condition in second digitally encoded data signals;

a third decision element for producing a third decision signal upon identification of said preselected condition in local data input signals;

a first gate element for transmitting said first data signals in response to said first decision signal, said first gate element transmitting said second data signals in response to said second decision signals, said transmitted signals from said first gate element providing communication station output signals;

a second gate element for transmitting said first data signals in response to said first decision signals, said second gate element transmitting said local input signals in response to said third decision signal; said transmitted signals from said second gate element providing first data output signals; and a third gate element for transmitting said second data signal in response to said second decision signal, said third gate element for transmitting said local input signals in response to said third decision signals, transmitted signals from said third gate element providing second data output signals.

14. The communication station of claim 13 further including means for digitally encoding said local data input signals; and means for decoding said digitally encoded communication station output signals.

15. The communication station of claim 13 wherein said communication system is comprised of said communication station, a first group of communication stations, and a second group of communication stations, said first input signal including signals from said first group of stations, said first output signals including signals to said second group of stations, said second input signal including signals from said second group of stations, said second output signal including signals to said first group of stations.

16. The communication station of claim 13 further including means for a synchronizing said second input signals with first clock signals; and means for synchronizing a selected one of said first and said second output signals with preselected clock signals.

17. A communication station for entering digitally encoded data into and for extracting digitally encoded data from a communication system, first means for combining first digitally encoded input data signals and local digitally encoded input signals to supply first output signals, wherein said first combining means transmitting signals from a one of said first data signals and said input signals having most recently included a preselected data condition;

second means for combining second digitally encoded input data signals and said local input signals to supply a second output signal, wherein said second combining means transmitting signals from a one of said second data input and said local input signals having most recently included said preselected data condition; and third means for combining said second input data signals and said first data input signals to supply information to said communication station.

18. The communication station of claim 17 wherein said preselected condition is an initiation of vocal information.

19. The communication station of claim 17 wherein said signals include continuously variable slope delta modulation of vocal information.

20. A communication station for entering digitally encoded data into and extracting digitally encoded data from a communication system, first means for combining first input data signals, wherein said first combining means supplies signals from a one of said first data signals and said input signals and said input signals display a preselected condition;

second means for combining second input data signals and said local input signals to supply a second output signal, wherein said second combining means supplies signals from a one of said second data input and said local input signals displaying said preselected condition; and third means for combining said second input data signals and said first data input signals to supply information to said communication station, wherein said signals include continuously variable slope delta modulation of vocal information and wherein three consecutive identical logical signals identify the initiation of vocal information in a signal channel.

* * * * *